(12) United States Patent
Sato et al.

(10) Patent No.: US 8,935,959 B2
(45) Date of Patent: Jan. 20, 2015

(54) THERMAL TYPE FLOW RATE SENSOR

(75) Inventors: Ryo Sato, Hitachinaka (JP); Keiji Hanzawa, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 334 days.

(21) Appl. No.: 13/638,259

(22) PCT Filed: Apr. 1, 2011

(86) PCT No.: PCT/JP2011/058391
§ 371 (c)(1),
(2), (4) Date: Sep. 28, 2012

(87) PCT Pub. No.: WO2011/125923
PCT Pub. Date: Oct. 13, 2011

(65) Prior Publication Data
US 2013/0025363 A1    Jan. 31, 2013

(30) Foreign Application Priority Data

Apr. 1, 2010    (JP) ................. 2010-084784

(51) Int. Cl.
*G01F 1/68* (2006.01)
*G01F 1/692* (2006.01)
*G01F 1/696* (2006.01)
*G01F 25/00* (2006.01)

(52) U.S. Cl.
CPC ............... *G01F 1/692* (2013.01); *G01F 1/696* (2013.01); *G01F 25/0007* (2013.01)
USPC .................................................... 73/204.18

(58) Field of Classification Search
USPC ................ 73/204.26, 204.16, 204.18, 152.59
See application file for complete search history.

(56) References Cited

U.S. PATENT DOCUMENTS 4,821,700 A * 4/1989 Weibler et al. ................ 123/494
4,884,443 A * 12/1989 Lee et al. .................... 73/204.16
(Continued)

FOREIGN PATENT DOCUMENTS

JP         6-37334 A    2/1994
JP      2002-48616 A    2/2002
(Continued)

OTHER PUBLICATIONS

Corresponding International Search Report with English Translation dated May 10, 2011 (five (5) pages).

*Primary Examiner* — Jewel V Thompson
(74) *Attorney, Agent, or Firm* — Crowell & Moring LLP

(57) ABSTRACT

To reduce a signal variation of a bridge circuit connected with a temperature sensing resistor that is caused by a strain even when the strain is generated at a diaphragm portion of a substrate installed with a heater resistor and the temperature sensing resistor. In a thermal type flow rate resistor including a substrate, a diaphragm 13 formed at the substrate, and a heat generating resistor 2 and temperature detecting resistors 7 through 10 formed on the diaphragm for detecting a flow rate of a measured fluid by heating the heat generating resistor, strain detecting resistors 11 and 12 are formed on an upstream side and on a downstream side of a flow of the measured fluid relative to the heat generating resistor on the diaphragm, an amount of a strain generated on the diaphragm is detected by the strain detecting resistors, and a flow rate signal detected by the heat generating resistor and the temperature detecting resistors is compensated for the strain based on the detected amount of the strain.

9 Claims, 10 Drawing Sheets

(56) References Cited

U.S. PATENT DOCUMENTS

| | | | |
|---|---|---|---|
| 6,631,638 B2 * | 10/2003 | James et al. | 73/204.26 |
| 6,647,778 B2 * | 11/2003 | Sparks | 73/204.26 |
| 7,171,851 B2 * | 2/2007 | Kamata | 73/152.59 |
| 7,654,137 B2 * | 2/2010 | Hirata et al. | 73/204.18 |
| 8,429,964 B2 * | 4/2013 | Sakuma | 73/204.26 |
| 2006/0065049 A1 | 3/2006 | Nakada et al. | |
| 2006/0137442 A1 * | 6/2006 | Kamata | 73/152.59 |
| 2007/0089504 A1 * | 4/2007 | Hanzawa et al. | 73/204.26 |
| 2008/0168650 A1 * | 7/2008 | Sakuma | 29/612 |
| 2008/0250855 A1 | 10/2008 | Nakada et al. | |

FOREIGN PATENT DOCUMENTS

| | | |
|---|---|---|
| JP | 2005-241279 A | 9/2005 |
| JP | 2006-98057 A | 4/2006 |
| JP | 2007-286008 A | 11/2007 |

* cited by examiner

F I G . 2
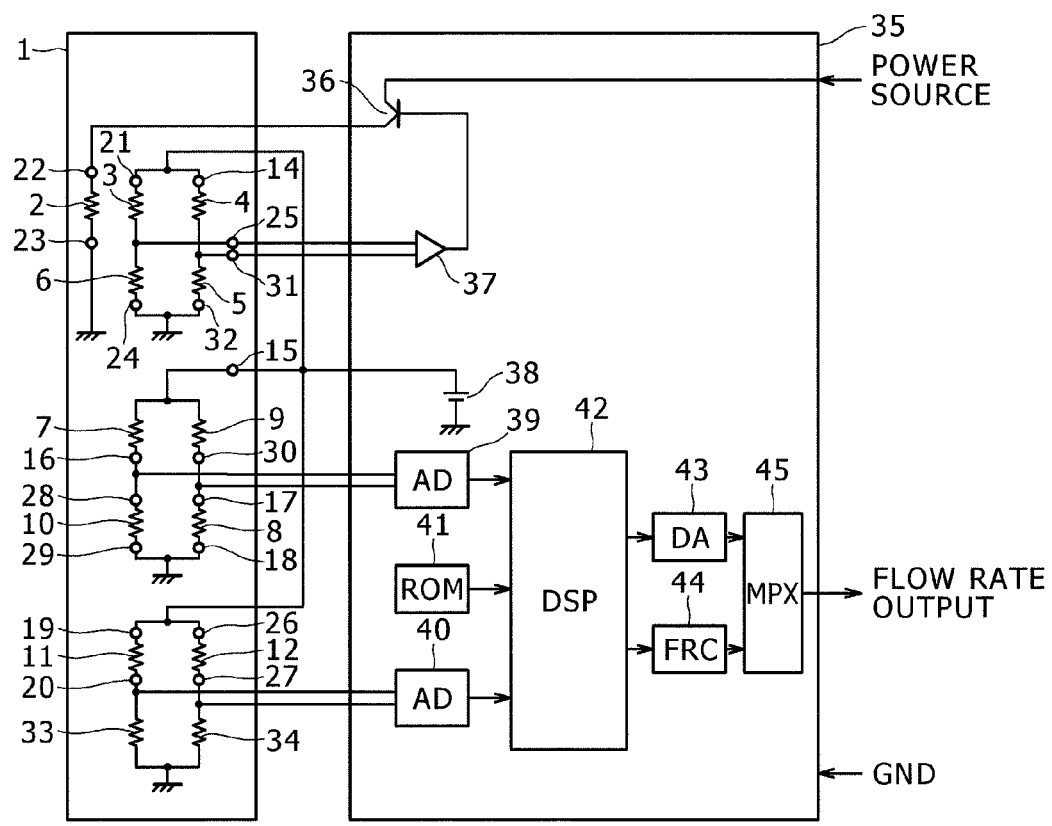

F I G . 7
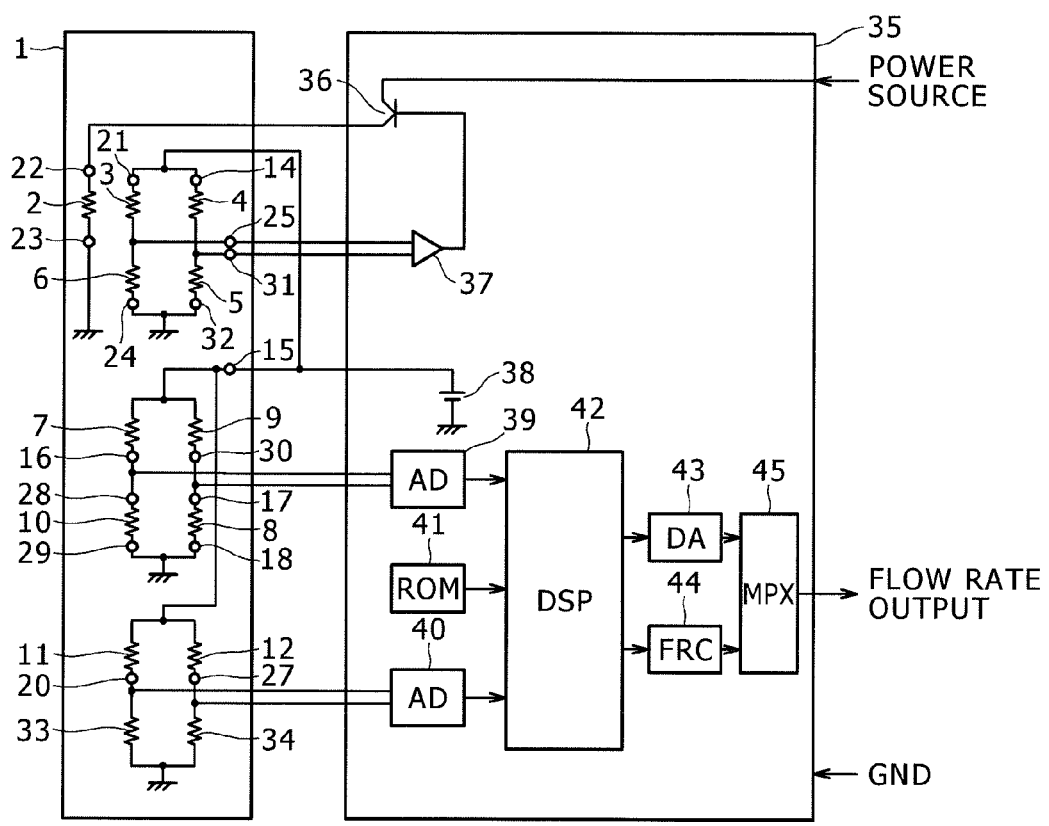

A–A' SECTION

THERMAL TYPE FLOW RATE SENSOR

TECHNICAL FIELD

The present invention relates to a flow rate sensor which measures a flow rate by using a heat generating resistor. For example, the present invention relates to a flow rate measuring device which detects an amount of air that is sucked to an automobile engine.

BACKGROUND ART

In a background art, as a flow rate sensor which is installed at a suction air passage of an internal combustion engine of an automobile or the like for measuring a suction air amount, a thermal type one is mainly used. This is because a thermal type flow rate sensor can directly measure a mass flow rate.

In recent years, low fuel consumption and exhaust gas regulation are becoming severe from a view point of global environment protection. Therefore, in a flow rate sensor which measures a suction air amount, there are manifested needs for high accuracy, backflow detection, dynamic range expansion, and suchlike.

In a thermal type flow rate sensor which deals with such needs, in recent years, attention is paid to fabricate a sensing element which measures a flow rate on a semiconductor substrate of silicon or the like by using a semiconductor microfabrication technology. Because a sensing element of this kind can comparatively easily be mass-produced, and therefore, the sensing element is excellent in economy, can be downsized and can be driven by low power consumption. As such a flow rate sensor, there is a flow rate sensor described in Patent Literature 1.

In the case of the flow rate sensor described in Patent Literature 1, the sensing element is formed with a sensing resistor on a silicon substrate via an insulating layer, and formed with a thin film portion (diaphragm portion) by removing a portion of the silicon substrate in order to thermally insulate the resistor. A heat generating resistor can be formed by arranging a resistor which is driven as a heater at the diaphragm portion. In detecting a flow rate, there is adopted a temperature difference system in which temperature sensing resistors are formed on an upstream side and on a downstream side of an air flow by interposing the heat generating resistor, and a flow rate and a direction are detected based on a difference between temperatures of the temperature sensing resistors that are arranged on the upstream side and on the downstream side.

CITATION LIST

Patent Literature

Patent Literature 1: Japanese Unexamined Patent Publication No. 2002-48616

SUMMARY OF INVENTION

Technical Problem

In Patent Literature 1, polysilicon is adopted for the resistor. A semiconductor material such as polysilicon has a piezoresistive effect in which a resistance value of the material is changed owing to a strain that is generated by deforming a shape of the material. An amount of influence of the piezoresistive effect is determined by a gauge factor of the material and the influence is effected even on a metal material of platinum or the like. Therefore, the semiconductor type flow rate sensor poses a problem that an abnormal output is easy to be brought about owing to the piezoresistive effect.

Hence, it is an object of the present invention that even when a strain is produced at a diaphragm portion of a substrate that is installed with a heater resistor and a temperature sensing resistor, a variation in a signal of a bridge circuit connected with the temperature sensing resistor that is caused by the strain is reduced.

Solution to Problem

The object described is achieved by an invention described in claims.

For example, the object described above can be achieved by providing a structure as follows to a thermal type flow rate sensor including a substrate, a diaphragm formed at the substrate, and a heat generating resistor and a temperature detecting resistor formed on the diaphragm, and detecting a flow rate of a measured fluid by heating the heat generating resistor. Strain detecting resistors are formed on an upstream side and on a downstream side of a flow of the measured fluid relative to the heat generating resistor on the diaphragm. An amount of a strain generated on the diaphragm is detected by the strain detecting resistors, and a flow rate signal detected by the heat generating resistor and the temperature detecting resistor is compensated for the strain based on the amount of the strain detected. An amount of a strain effect can be removed and an abnormal output can be made difficult to be brought about by the compensation.

Advantageous Effects of Invention

According to the present invention, even when a strain is generated at a diaphragm portion of a substrate installed with a heater resistor and a temperature sensing resistor, a signal variation of a bridge circuit connected with a temperature sensing resistor caused by the strain can be reduced.

BRIEF DESCRIPTION OF DRAWINGS

FIG. 2 is a diagram of a configuration of a circuit of the flow rate sensor according to the first embodiment of the present invention.

FIG. 7 is a diagram of a configuration of a circuit of the flow rate sensor according to the third embodiment of the present invention.

DESCRIPTION OF EMBODIMENTS

As described above, the semiconductor flow rate sensor poses a problem that an abnormal output owing to the piezoresistive effect is easy to be brought about. The reason is that a film thickness of the diaphragm portion is only about 1 through 2 μm, and therefore, the diaphragm portion undergoes (1) a stress when the sensing element is adhered to a supporter, (2) a stress when the supporter is adhered to be mounted on a casing or the like, (3) a stress which is generated from a difference of linear expansion coefficients of mounting members that is generated by a change in an environmental temperature, and (4) various deformations of a thermal deformation and the like that are brought about by making a heater generate heat.

Particularly, it is preferable that the temperature sensing resistors which are formed by interposing a heater have high resistance values in view of performances thereof. Therefore, it is necessary to form the resistor such that a width of the resistor is slender and a length thereof is prolonged as a shape thereof. Therefore, the temperature sensing resistors are easy to undergo the piezoresistive effect by the stresses described above. As a result thereof, there is a possibility that the temperature sensing resistors formed by interposing the heater have resistance values respectively different from each other and an abnormal output is generated. Further, also the heater temperature detecting resistor needs to be arranged at a vicinity of the heater resistor, and it is necessary to form the heater temperature detecting resistor such that a width thereof is slender and a length thereof is prolonged similar to the temperature sensing resistor described above. As a result thereof, a resistance value of the heater temperature detecting resistor is changed, and a temperature of the heater cannot correctly be detected. As a result thereof, there is a possibility that the temperature of the heater cannot be controlled to a prescribed temperature and the abnormal output is brought about.

An explanation will be given of embodiments of the present invention in reference to FIG. 1 through FIG. 10 as follows.

Figure 1:
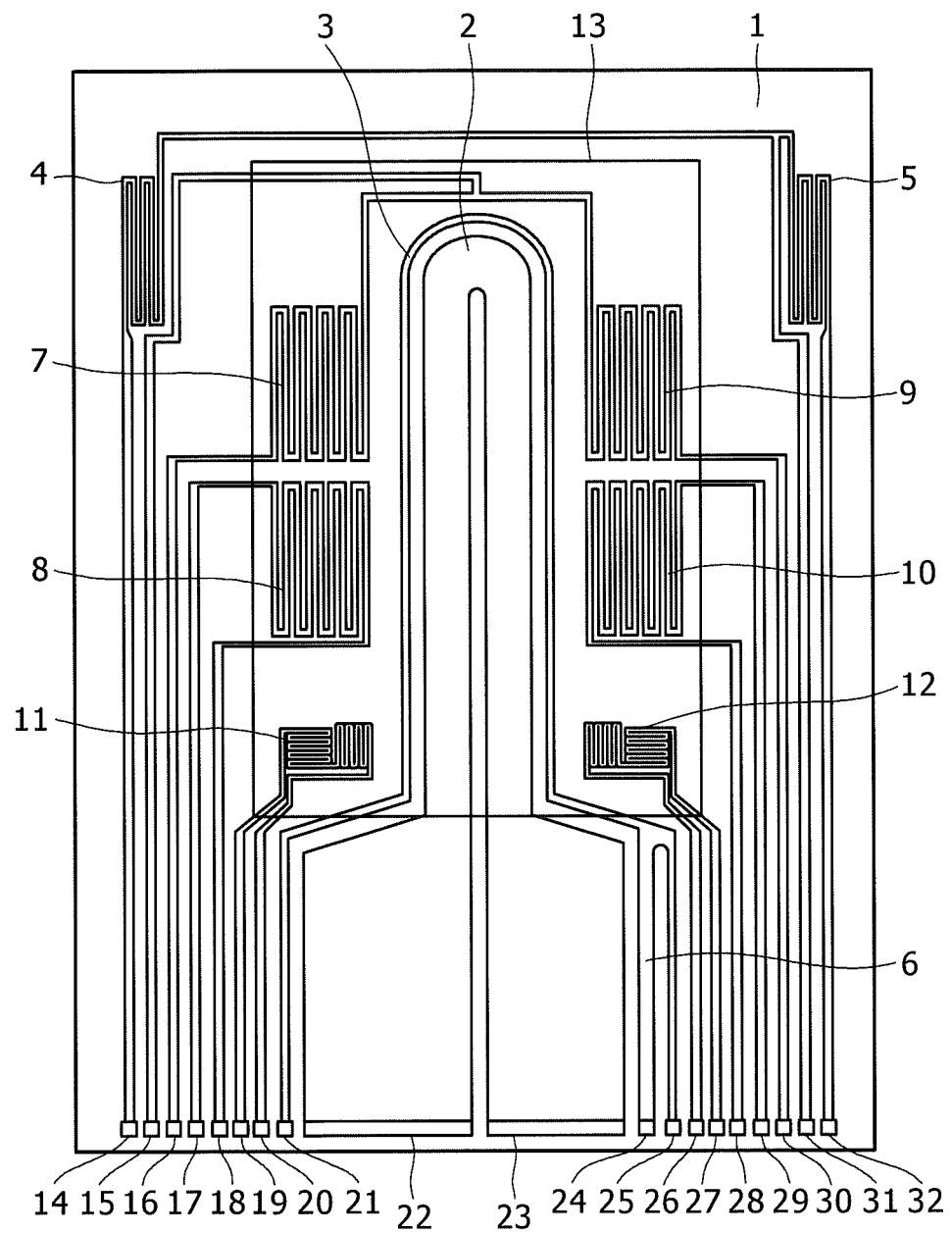
FIG. 1 is a diagram of a pattern of a sensing element of a flow rate sensor according to a first embodiment of the present invention.

FIG. 1 is a diagram showing a plane structure of a flow rate detecting element of a flow rate sensor according to a first embodiment of the present invention.

In FIG. 1, a detecting element 1 is formed with a cavity portion at a back face of a substrate which is configured by a material that is excellent in a heat conductivity of silicon, ceramic or the like and the cavity portion is formed with a diaphragm 13 for detecting a flow rate of air. The cavity portion is formed by etching from the back face side of the substrate by an alkaline solvent or the like. A heater resistor 2 which is a resistor for setting a flow rate is arranged on the diaphragm 13, and a heater temperature detecting resistor 3 is arranged to surround a surrounding of the heater resistor 2. Upstream side temperature sensing resistors 7 and 8 are arranged on an upstream side of a flow and downstream side temperature sensing resistors 9 and 10 are arranged on a downstream side thereof relative to the heater resistor 2. Strain detecting resistors 11 and 12 are arranged on the diaphragm 13 among bonding terminals 14 through 32 which are used for connecting the temperature sensing resistors 7 through 10 and external terminals.

Fixed resistors 5 and 6 and a temperature measuring resistor 4 are formed on the substrate at a surrounding of the diaphragm 13. The resistors configured on the detecting element 1 are made by a semiconductor film of polysilicon or the like and a metal film of platinum or the like resistance values of which are changed by a temperature. These elements are connected to outside by the bonding terminals 14 through 32. Thereby, an influence of a strain that is generated at the resistor on the diaphragm 13 can be excluded, or there can be provided a flow rate output in which a stress that is generated by the strain is alleviated.

Incidentally, all of the heater resistor 2 and the heater temperature detecting resistor 3, the upstream side temperature sensing resistors 7 and 8, the downstream side temperature sensing resistors 9 and 10, the strain detecting resistors 11 and 12 which are resistors for detecting strain amounts, the fixed resistors 5 and 6, and the temperature measuring resistor 4 are configured by the same material. Thereby, there can be configured a flow rate sensor which can provide a flow rate output excluding an influence of a strain that is generated at the resistor on the diaphragm 13 in mounting the diaphragm or the like without increasing cost.

FIG. 2 is a diagram showing a configuration of a circuit of the flow rate sensor according to the first embodiment of the present invention.

In FIG. 2, the flow rate sensor includes the detecting element 1 which detects an air flow rate, an air temperature, and a strain amount that is generated at the diaphragm 13, and an ASIC circuit 35 for converting the air flow rate and the strain amount into electric signals and adjusting the air flow rate excluding the strain amount to a prescribed characteristic.

A power source 38 is connected to a bridge circuit formed by the heater temperature detecting resistor 3, the temperature measuring resistor 4, and the fixed resistors 5 and 6. The bonding terminal 25 showing a potential of a connection point of the heater temperature detecting resistor 3 and the fixed resistor 6, and the bonding terminal 31 showing a potential of a connection point of the temperature measuring resistor 4 and the fixed resistor 5 are connected to an input terminal of an operational amplifier 37. The operational amplifier 47 controls a heating current which is supplied to the heater resistor 2 by a feedback control such that these potentials become the same. Here, the heating current is supplied by a transistor 36 which is controlled by the operational amplifier 37.

The power source 38 is connected to a bridge circuit which is arranged on an upstream side of a flow direction of air relative to the heater resistor 2. The bridge circuit is formed by the temperature sensing resistors 7 and 8, and the temperature sensing resistors 9 and 10 which are arranged on a downstream side of a flow direction of air relative to the heater resistor 2, resistance values of which are changed by an influence of heat from the heater resistor 2.

The power source 38 is also connected to a bridge circuit which is formed by the strain detecting resistors 11 and 12 which detect amounts of strains generated at the diaphragm 13, and fixed resistors 33 and 34.

With regard to a differential signal in correspondence with an air flow rate, the bonding terminal 16 (or 28) indicating a potential at a connection point of the temperature sensing resistors 7 and 10, and the bonding terminal 30 (or 17) indicating a potential at a connection point of the temperature sensing resistors 8 and 9 are connected to an A-D converter 39. Also, with regard to a differential signal in correspondence with an amount of a strain generated at the diaphragm 13, the bonding terminal 20 indicating a potential at a connection point of the strain detecting resistor 11 and the fixed resistor 33, and the bonding terminal 27 indicating a potential at a connection point of the strain detecting resistor 12 and the fixed resistor 34 are connected to an A-D converter 40. Outputs of the A-D converters 39 and 40 are inputted to DSP 42. At DSP 42, the amount of the strain generated at the diaphragm 13 is compensated for, adjusted to a prescribed characteristic, and outputted by using adjustment information stored at ROM 41. The adjusted flow rate signal is inputted to a D-A converter 43 or a frequency output converter (FRC) 44, and is converted into a voltage signal or a frequency signal. Finally, the voltage signal or the frequency signal is outputted as a flow rate output by a multiplexer (MPX) 45 which is a change-over switch based on information stored in ROM 41.

As shown in FIG. 2, the ASIC circuit 35 is configured by the operational amplifier 37, the power source 38, the transistor 36, the A-D converters 39 and 40, ROM 41, DSP 42, the D-A converter 43, and the multiplexer (MPX) 45.

By the ASIC circuit 35, there is obtained an output in which an output of the bridge circuit which is formed by the upstream side temperature sensing resistors 7 and 8 which are arranged on the upstream side in an air flow direction relative to the heat resistor 2, and the downstream side temperature sensing resistors 9 and 10 which are arranged on the downstream side of the air flow direction relative to the heater resistor 2, resistance values of which are changed by an effect of heat from the heater resistor 2 and the output is compensated for a strain effect. In this way, an abnormal output is made difficult to be brought about by removing an amount of the strain effect from the output of the bridge circuit.

Figure 3:
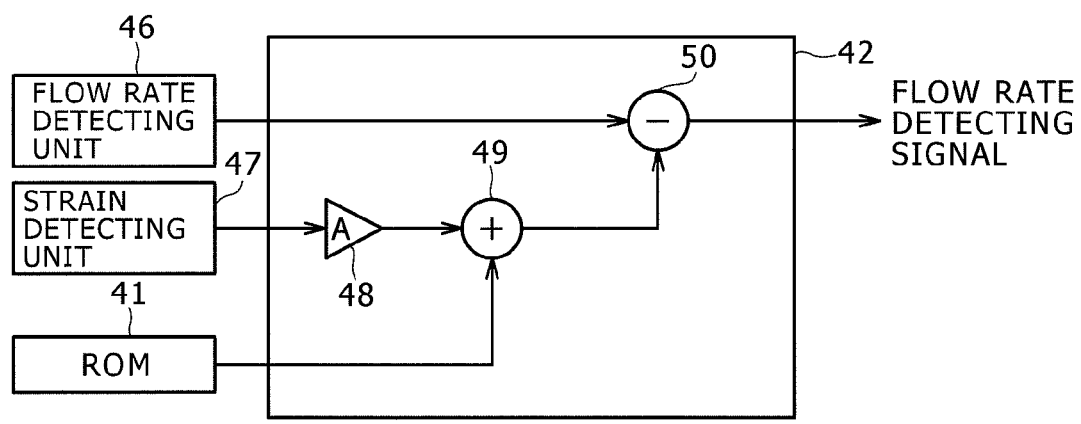
FIG. 3 is a diagram showing an operation processing at inside of the flow rate sensor according to the first embodiment of the present invention.

FIG. 3 is a diagram indicating an operation processing executed at inside of DSP 42 at inside of the ASIC circuit 35 of the flow rate sensor according to the first embodiment of the present invention.

In FIG. 3, a signal detected at a strain detecting unit 47 is very small, and therefore, the signal is multiplied by a prescribed gain at an operator 48. Thereafter, a strain detecting signal as amplified, and a strain amount at an initial state which is previously written to ROM 41 are inputted to an operator 49, where a difference therebetween is calculated. A net strain amount is calculated by the calculation. An output from a flow rate detecting unit 46 and a strain detecting signal which is calculated by the operator 49 are inputted to an operator 50, where a prescribed operation is executed and a true flow rate detecting signal is outputted.

Figure 4:
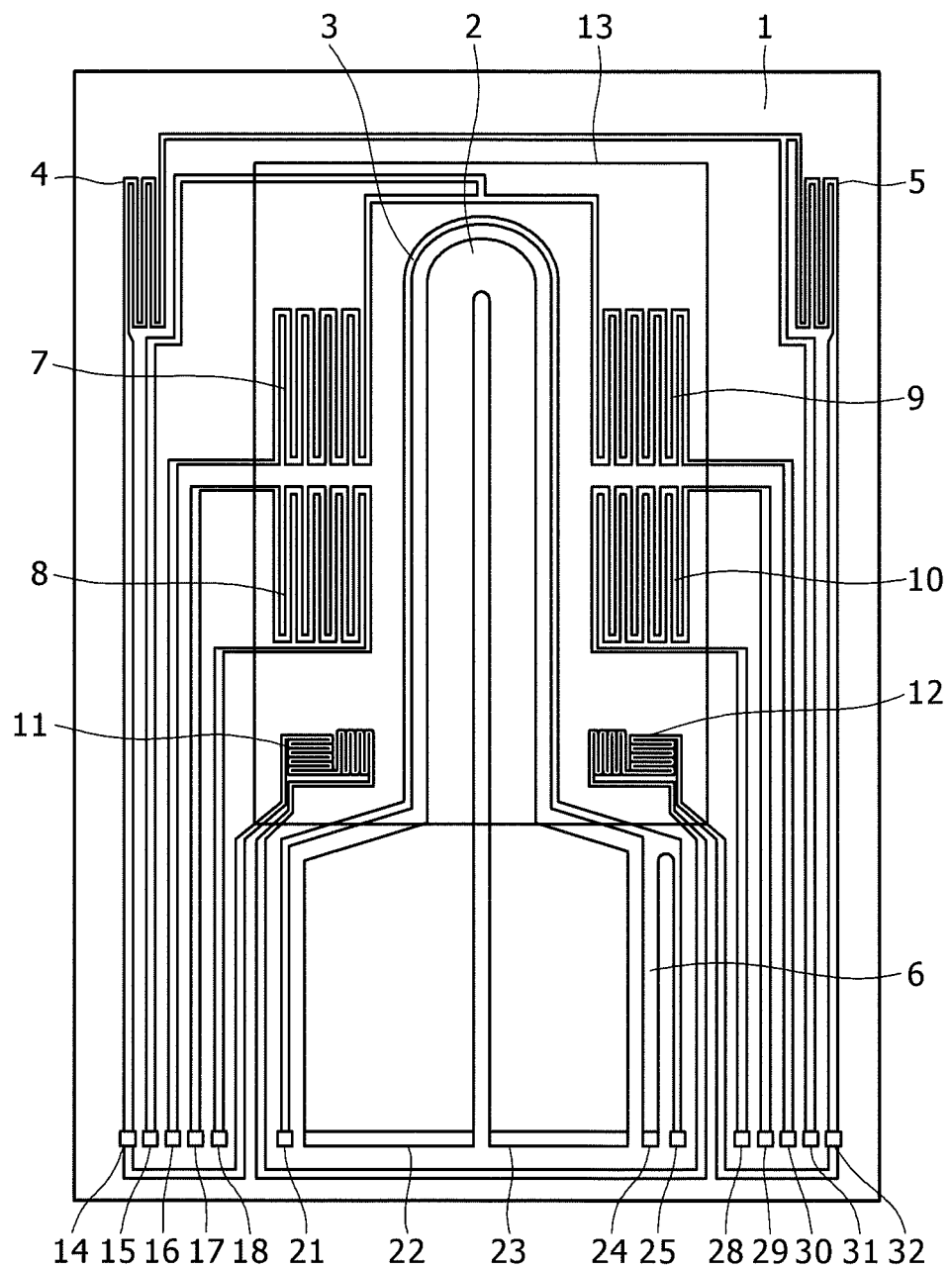
FIG. 4 is a diagram of a pattern of a sensing element of a flow rate sensor according to a second embodiment of the present invention.
Figure 5:
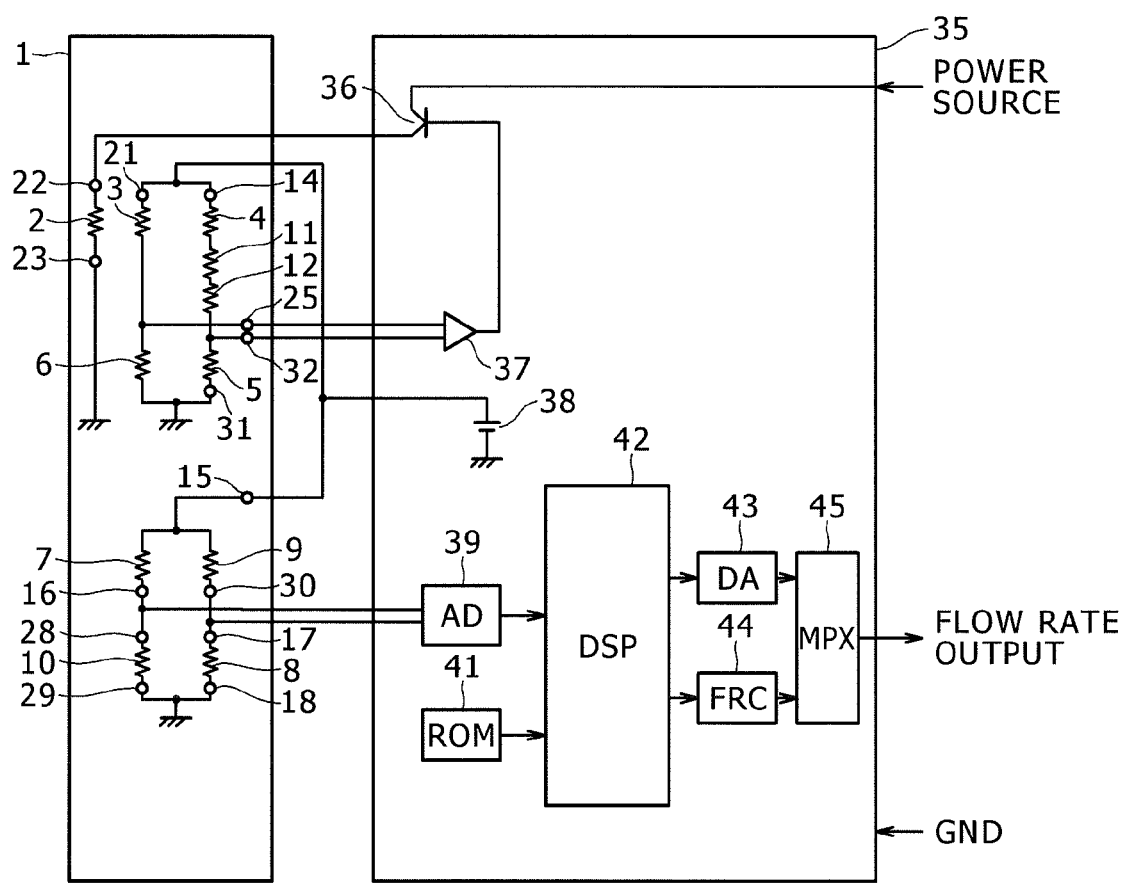
FIG. 5 is a diagram of a configuration of a circuit of a flow rate sensor according to the second embodiment of the present invention.

FIG. 4 is a diagram showing a plane structure of a flow rate detecting element of a flow rate sensor according to a second embodiment of the present invention. Also, FIG. 5 is a diagram showing a circuit configuration of the flow rate sensor according to the second embodiment of the present invention. According to the second embodiment, the power source 48 is connected to a bridge circuit which is formed by the heater temperature detecting resistor 3, the temperature measuring resistor 4, the fixed resistors 5 and 6, and the strain detecting resistors 11 and 12. Also, the bonding terminal 25 indicating the potential at the connection point of the heater temperature detecting resistor 3 and the fixed resistor 6, and the bonding terminal 31 indicating the potential at the connection point of the temperature measuring resistor 4 and the fixed resistor 5 are inputted to the input terminals of the operational amplifier 37. The operational amplifier 37 controls the heating temperature supplied to the heater resistor 2 by a feedback control such that these potentials are equal to each other. Here, the heating temperature is supplied by the transistor 36 controlled by the operational amplifier 37.

Here, an explanation will be given of a method of excluding an influence of the strain from the flow rate output when the strain is generated at the diaphragm 13. As described above, the operational amplifier 37 controls the heating current by the feedback control such that the potential at the input terminal stays the same. The following relationship can be derived from the feedback control. When it is designated that the heater temperature detecting resistor 3: Rht, the temperature measuring resistor 4: Rc, the fixed resistor 5: R7, the fixed resistor 5: R1, the strain detecting resistor 11: Rp1, and the strain detecting resistor 12: Rp2, $$R1 \cdot [Rc+(Rp1+Rp2)]=Rht \cdot R7$$

When the relationship is developed with regard to Rht by putting Rp=Rp1+Rp2, $$Rht=R1/R7 \cdot (Rc+Rp)$$

Here, when a resistance of the resistor on the diaphragm is changed by a mounting stress or the like, it can be derived as follows.

$$Rht + \Delta Rht = R1/R7 \cdot (Rc + Rp + \Delta Rp)$$
$$= R1/R7 \cdot (Rc + Rp) + R1/R7 \cdot \Delta Rp$$

Here, a change in a resistance by a strain is generally represented by the following equation.

$$\Delta R/R = K \cdot \epsilon \text{ (}K\text{: gage factor, } \epsilon\text{: strain)}$$

$$\Delta R = K \cdot \epsilon \cdot R$$

Thereby, the strain detecting resistor Rp may be set as follows.

$$\Delta Rht = R1/R7 \cdot \Delta Rp$$

$$K \cdot \epsilon \cdot Rht = R1/R7 \cdot K \cdot \epsilon \cdot Rp$$

$$Rht = R1/R7 \cdot Rp$$

$$Rp = R7/R1 \cdot Rht$$

$$Rp1+Rp2 = R7/R1 \cdot Rht$$

The influence by the strain of the heater temperature control bridge can be excluded when the strain is generated at the diaphragm 13 by setting the strain detecting resistor as described above.

With regard to the differential signal in correspondence with the air flow rate, the bonding terminal 16 (or 28) indicating the potential at the connection point of the temperature sensing resistors 7 and 10, and the bonding terminal 30 (or 17) indicating the potential at the connection point of the temperature sensing resistors 8 and 9 are connected to the A-D converter 39. The output of the A-D converter 39 is inputted to DSP 42. At DSP 42, the output is adjusted to a prescribed characteristic and outputted by using the adjustment information stored to ROM 41. The flow rate signal as adjusted is inputted to the D-A converter 43 or the frequency output converter (FRC) 44, and converted into the voltage signal or the frequency signal. Finally, the voltage signal or the frequency signal is outputted as the flow rate output by the multiplexer (MPX) 45 which is the change-over switch based on the information stored to ROM 41.

The compensation of the stress effect can be provided to the bridge circuit controlling the heater temperature detecting resistor 3 at a constant temperature by configuring the bridge circuit by the heater temperature detecting resistor 3, the temperature measuring resistor 4, the fixed resistors 5 and 6, and the strain detecting resistors 11 and 12 in this way.

Figure 6:
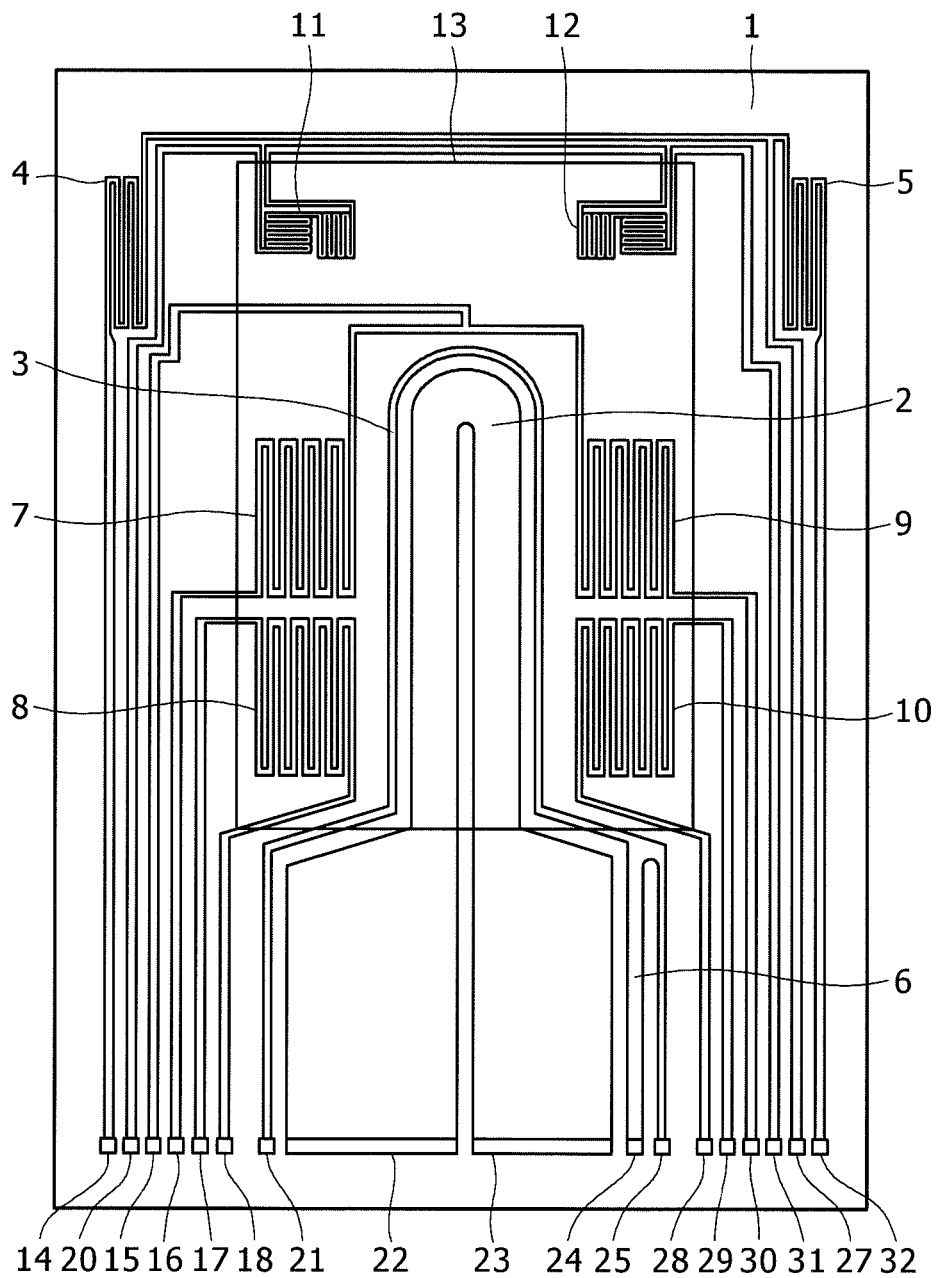
FIG. 6 is a diagram of a pattern of a sensing element sensor of a flow rate sensor according to a third embodiment of the present invention.

FIG. 6 is a diagram showing a plane structure of a flow rate detecting element of a flow rate sensor according to a third embodiment of the present invention. Also, FIG. 7 is a diagram showing a circuit configuration of the flow rate sensor according to the third embodiment of the present invention. According to the third embodiment, the arrangement of the plane detecting resistors 11 and 12 according to the first embodiment is changed. Although according to the first embodiment, the strain detecting resistors 11 and 12 are arranged among the bonding terminals 14 through 32 which are used for connecting the temperature sensing resistors 7 through 10 to the external terminals, according to the third embodiment, the strain detecting resistors 11 and 12 are arranged on the diaphragm 13 on a side opposed to the bonding terminals 14 through 18, 20 through 25, and 27 through 32 with the temperature sensing resistors 7 through 10 as references. The third embodiment is similar to the first embodiment in the circuit operation. The present embodiment achieves an effect in a case where also the side opposed to the side of the bonding terminals is adhered to mount when the detecting element 1 is mounted to a supporter 60 (FIG. 9).

Figure 8:
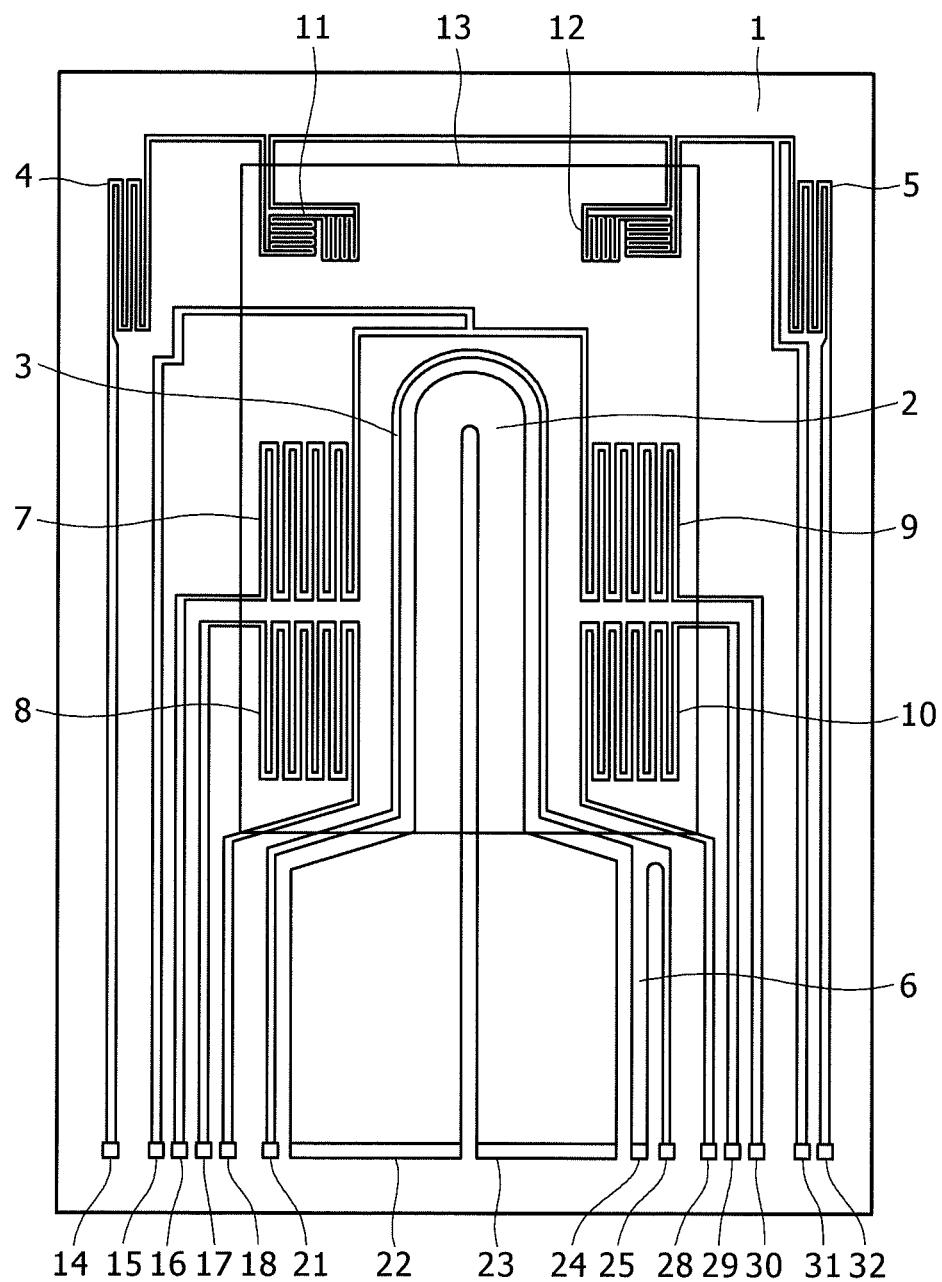
FIG. 8 is a diagram of a pattern of a sensing element of a flow rate sensor according to a fourth embodiment of the present invention.

FIG. 8 is a diagram showing a plane structure of a flow rate detecting element of a flow rate sensor according to a fourth embodiment of the present invention. According to the fourth embodiment, the arrangement of the plane detecting resistors 11 and 12 according to the second embodiment is changed. Although according to the second embodiment, the strain detecting resistors 11 and 12 are arranged among the bonding terminals 14 through 32 which are used for connecting the temperature sensing resistors 7 through 10 to the external terminals, according to the fourth embodiment, the strain detecting resistors 11 and 12 are arranged on the diaphragm 13 on the side opposed to the bonding terminals 14 through 18, 20 through 25, and 27 through 32 with the temperature sensing resistors 7 through 10 as references. The present embodiment also achieves an effect in a situation similar to that of the third embodiment.

Figure 9:
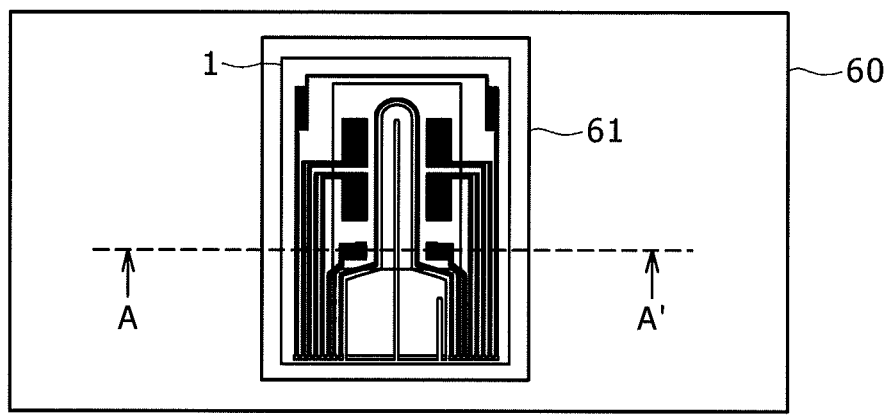
FIG. 9 is a view showing an influence of a stress in mounting which is effected on a flow rate sensor according to an embodiment of the present invention.
Figure 9:
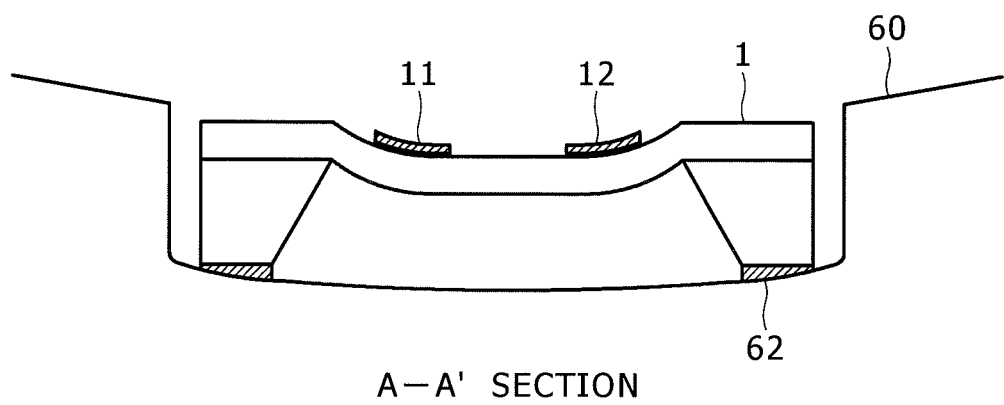

FIG. 9 is a diagram showing a stress effect when the detecting element 1 of a flow rate sensor according to an embodiment of the present invention is mounted on the supporter 60. The detecting element 1 is adhered to a concave portion 61 (cavity) which is formed at the supporter 60 by an adhesive agent 62. Here, it is shown that when a stress is applied to the detecting element 1 from the supporter 60 and the adhesive agent 62 by a change in a environment temperature or the like, the diaphragm 13 on the detecting element 1 is deformed into a concave or convex shape, and the deformation is detected by the strain detecting resistors 11 and 12.

Figure 10:
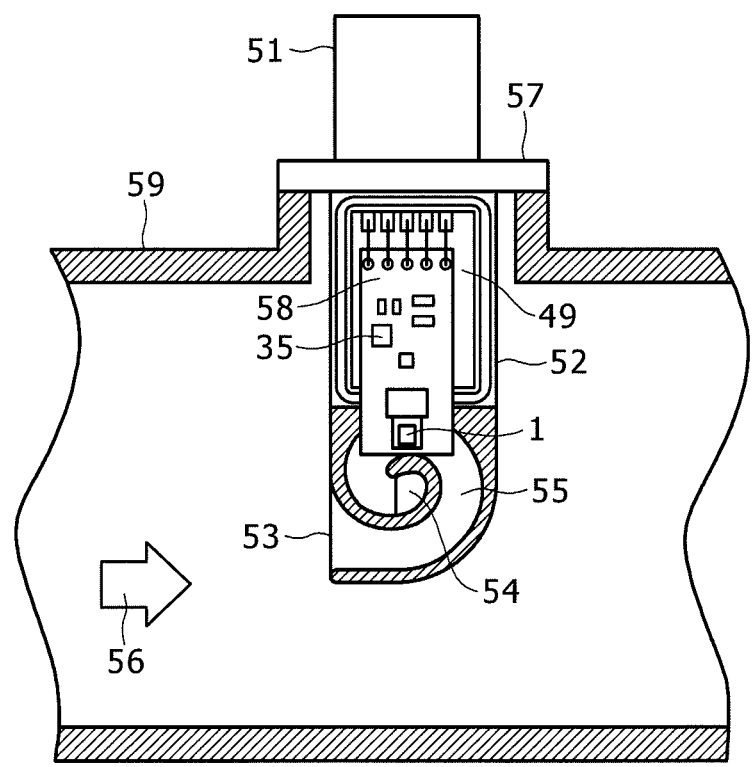
FIG. 10 is a schematic sectional view of mounting a flow rate sensor according to an embodiment of the present invention in an actually used state.

FIG. 10 is a schematic sectional view of mounting a flow rate sensor according to the present invention in an actually used state.

In FIG. 10, a flow rate sensor 51 is mounted in the form of being inserted into an intake pipe 59, and is fixed to the intake pipe 59 by a flange 27. A housing 52 is attached with the supporter 60 which is mounted with the detecting element 1 and the ASIC circuit 35.

An air flow 56 flowing in the intake pipe 59 is shunted into the flow rate sensor 51 by an air inlet port 53, detours above the detecting element 1 bypassing a bypass passage 55 and is returned into the main intake pipe 59 from a passage outlet 54.

LIST OF REFERENCE SIGNS 1 detecting element
2 heater resistor
3 heater temperature detecting resistor
4 temperature measuring resistor
5, 6, 33, 34 fixed resistors
7, 8 upstream side temperature sensing resistors
9, 10 downstream side temperature sensing resistors
11, 12 strain detecting resistors
13 diaphragm
14 to 32 bonding terminals
35 ASIC circuit
36 transistor
37 operational amplifier
38 power source
39, 40 A-D converters
41 ROM
42 DSP
43 D-A converter
44 frequency output converting circuit (FRC)
45 multiplexer (MPX)
46 flow rate detecting unit
47 strain detecting unit
48 to 50 operators
51 flow rate sensor
52 housing
53 air inlet port
54 passage outlet
55 bypass passage
56 air flow
57 flange
58 base
59 intake pipe
60 supporter
61 cavity
62 adhesive agent

The invention claimed is:

1. A thermal type flow rate sensor comprising a substrate, a diaphragm formed at the substrate, and a heat generating resistor and a temperature detecting resistor formed on the diaphragm, and detecting a flow rate of a measured fluid by heating the heat generating resistor;
   wherein strain detecting resistors are formed on an upstream side and on a downstream side of a flow of the measured fluid relative to the heat generating resistor on the diaphragm;
   wherein an amount of a strain generated on the diaphragm is detected by the strain detecting resistor; and
   wherein a flow rate signal detected by the heat generating resistor and the temperature detecting resistor is compensated for the strain based on the detected amount of the strain.

2. The thermal type flow rate sensor according to claim 1, wherein the strain detecting resistor is electrically connected to the heat generating resistor and the temperature detecting resistor, and
   wherein a compensation for a stress effect is provided to a bridge circuit controlling the heat generating resistor at a constant temperature.

3. The thermal type flow rate sensor according to claim 1, wherein the strain detecting resistor is arranged between a bonding pad for electrically connecting to an external terminal and the temperature detecting resistor.

4. The thermal type flow rate sensor according to claim 1, wherein the strain detecting resistor is formed by polysilicon or a diffused resistor.

5. The thermal type flow rate sensor according to claim 1, comprising:
   a first A-D converter of inputting an output of a bridge circuit configured by the strain detecting resistor and a fixed resistor;

a second A-D converter of inputting an output from a bridge circuit configured by the temperature detecting resistor; and a memory previously stored with a piece of adjustment information, wherein the output of the bridge circuit configured by the temperature detecting resistor is compensated for the amount of the strain generated on the diaphragm detected by the strain detecting resistor.

6. The thermal type flow rate sensor according to claim 1, wherein a bridge circuit is configured by the heat generating resistor, the temperature detecting resistor, and the strain detecting resistor, and the heat generating resistor is controlled to be controlled at a constant temperature.

7. The thermal type flow rate sensor according to claim 1, wherein the strain detecting resistors are arranged respectively in a longitudinal direction and a transverse direction of the diaphragm.

8. The thermal type flow rate sensor according to claim 1, wherein the strain detecting resistor is arranged on a side opposed to a bonding pad of connecting the temperature detecting resistor and an external terminal.

9. The thermal type flow rate sensor according to claim 1, wherein the heat generating resistor, the temperature detecting resistor, and the strain detecting resistor are configured by the same material.

* * * * *